(No Model.) 7 Sheets—Sheet 3.
H. A. KELLER, W. G. COLE & J. E. GAYLORD.
ROASTING FURNACE.

No. 534,160. Patented Feb. 12, 1895.

(No Model.) 7 Sheets—Sheet 7.

H. A. KELLER, W. G. COLE & J. E. GAYLORD.
ROASTING FURNACE.

No. 534,160. Patented Feb. 12, 1895.

UNITED STATES PATENT OFFICE.

HERMANN A. KELLER, WILLIAM G. COLE, AND JARED E. GAYLORD, OF BUTTE, MONTANA.

ROASTING-FURNACE.

SPECIFICATION forming part of Letters Patent No. 534,160, dated February 12, 1895.

Application filed April 3, 1894. Serial No. 506,186. (No model.)

*To all whom it may concern:*

Be it known that we, HERMANN A. KELLER, WILLIAM G. COLE, and JARED E. GAYLORD, residents of Butte city, in the county of Silver Bow and State of Montana, have invented certain new and useful Improvements in Roasting-Furnaces; and we do hereby declare the following to be a full, clear, and exact description of the invention, such as will enable others skilled in the art to which it appertains to make and use the same.

Our invention relates to that class of furnaces for drying, desulphurizing and chloridizing ores or furnace products, in which a series of hearths are arranged one above the other and which communicate through alternate passages or openings near their ends. Each hearth is provided with a rake or plow for the purpose of mechanically stirring or agitating the bedded material and likewise to propel said material along each hearth and to successively discharge it upon the one below, until the roasted material passes out through the discharge in the lowest hearth.

The object of our invention is to reduce the expense of roasting or calcining, first, by saving fuel; secondly, by employing a simple, easily controlled mechanism, and, lastly, by aiming at a large output or capacity.

A further object is to construct the furnace so as to insure the complete control of the furnace and its mechanism whereby the greatest possible quantity of heat generated during the process of roasting, is preserved to the furnace and communicated to the ore or material under treatment for the purpose of aiding in the roasting of freshly supplied material.

A further object is to construct a roasting furnace in such manner that the operating mechanism, with the exception of the rake heads, shall be located exteriorly of the furnace structure.

With these objects in view the invention consists in certain novel features of construction and combinations and arrangements of parts as hereinafter set forth and pointed out in the claims.

In the accompanying drawings: Fig. 6 is an enlarged sectional view showing the joint between the sections of the rakes. Fig. 8 is a detached view of the part $G^3$. Fig. 14 is a view of the ends of the band B. Fig. 15 is a horizontal sectional view of the same. Fig. 16 is a transverse sectional view of drum of cylinder N'.

In carrying out this invention, we make use of an annular structure, subdivided into compartments, each of which forms an individual furnace and consists of a series of communicating hearths with a corresponding number of reciprocating rakes emanating from a central column. All air currents and drafts are under control. Circular furnaces in themselves are old and are constructed with the idea of saving space while having a maximum hearth surface.

Our apparatus consists in two distinct parts; an annular stationary structure on the outside and a centrally located mechanism.

Referring to the drawings: U represents the outer circular furnace wall and I a corresponding inner concentric wall. Between the two walls, with the outer wall as a base and the inner wall for the crown, are sprung a series of arches A, forming the different levels. Each arch forms the floor of one level and the roof of the next lower. Hollow piers P and P', built vertically between the walls, form supports across the structure and subdivide the latter into compartments, each of which forms an individual roasting furnace. Each of such furnaces is composed of a hearth H, upon which the roasting of the ore-bed takes place.

Openings or passages C are located near alternate ends of the hearths and serve the double purpose of discharging ore from one hearth upon the one directly below and also of creating a draft the complete length of each hearth. The shelves or hearths of the furnace may be stopped at the drop holes C, thereby leaving space back of each drop hole.

Besides being supports and directing the draft, the above-mentioned piers may be used as flues. Through the pier P heat is furnished and the pier P', in connection with horizontal pier $P^2$ beneath the lowest floor, preserves heat to the furnace where it is most needed. Pier P may be arranged as to admit artificial heat to any level and pier P' provided with openings $P^3$ so as to draw off foul gases at any level. Thus heat is preserved to the ore-beds, first by having successive floors and secondly by passing the heated gases along the entire length of each hearth, taking them subsequently through the furnace before allowing them to escape into the chimney. The openings $P^3$ are provided with swinging gates $P^4$ adapted to be opened by the engagement of the rake therewith, whereby to permit the escape of foul gases from the hearths.

While we prefer to make the piers hollow it is not absolutely necessary that they should be so made.

Figure 1:
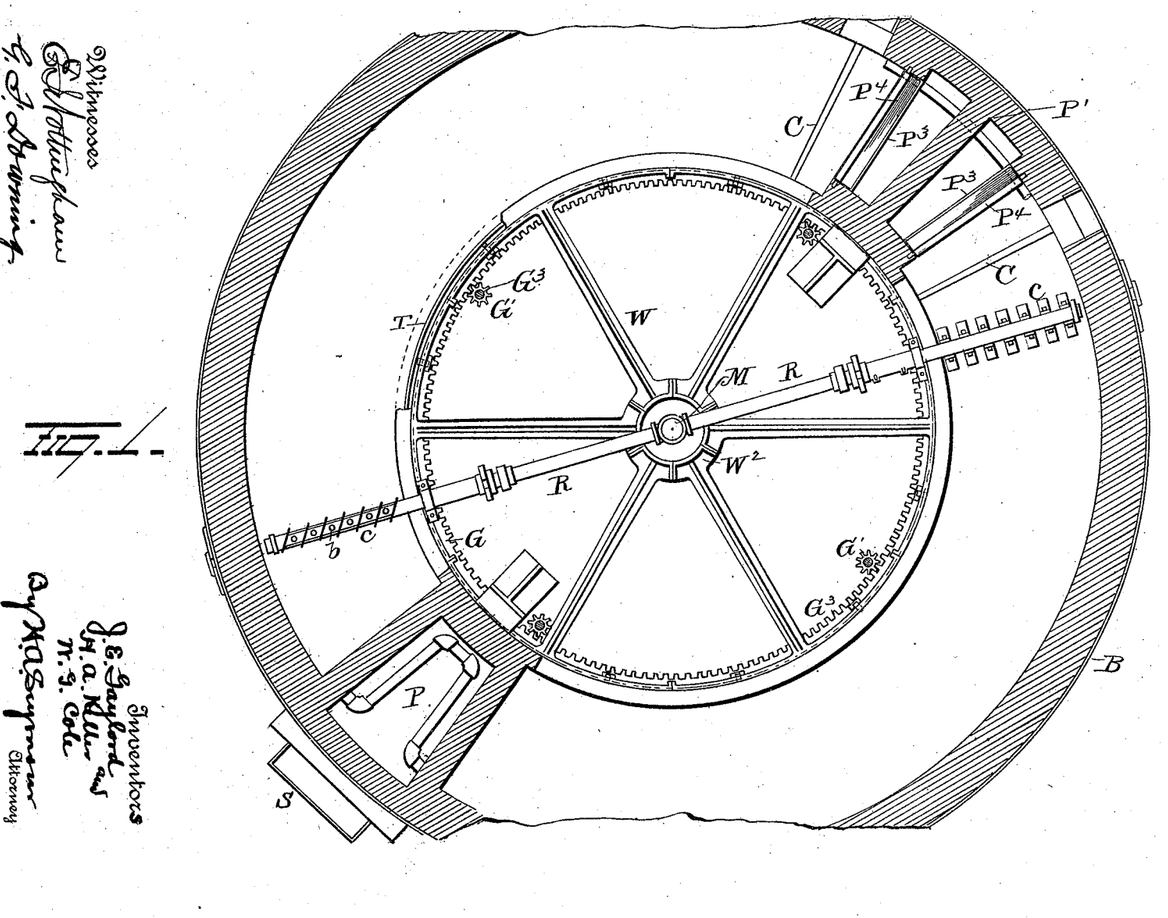
Figure 1 represents a horizontal sectional view.
Figure 2:
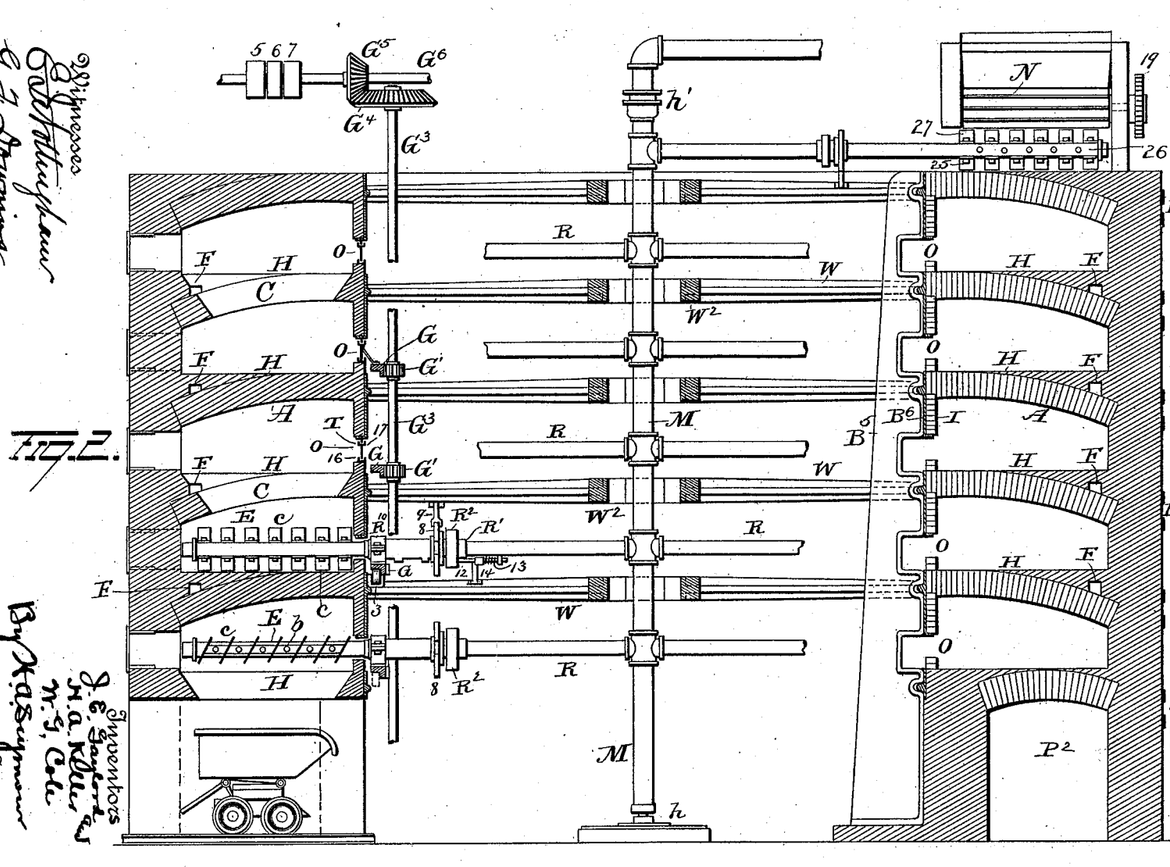
Fig. 2 represents a vertical sectional view.

It being of equal importance to guard against any excessive influx of cold air, heated fresh air alone can be made to enter the furnace. Air flues F are built in the brick work of the arches and are supplied with heated air from the pipes F' in the piers P, P', which heated air is permitted to escape from said flues F onto the hearths, through openings $F^2$ in the roofs of said hearths. Thus it will be seen that the flues F serve to lighten the weight of the furnace and at the same time admit fresh air or blast to any desired level. On the other hand these flues may simply be used to cool the furnace. The fresh air can be previously artificially heated in a fire place S, shown in Fig. 1.

The base of each arch is supported by means of binders B. In order to provide simple and efficient means for uniting the ends of the binders and locking the same, one end of each binder B has loops B' secured thereto by means of rivets $B^2$, the heads at the inner ends of which are countersunk as shown in Fig. 15. The other end of the binder or band has a loop $B^3$ secured thereto in the same manner. The loop $B^3$ is made to enter between the loops B' and a wedge $B^4$ passed through them, thus locking the ends of the band or binder firmly. Uprights $B^5$ are located in proximity to the inner wall of the furnace, preferably at diametrically opposite points, and support face plates $B^6$ placed against said inner wall. The inner end of each crown of the furnace arches is preferably braced by means of spokes or braces W having the plates $B^6$ at their ends, which bear against the inner furnace walls, each series of such spokes or braces being secured to and made to project from the hub $W^2$.

The operating mechanism of the furnace consists of the stirring or raking apparatus and of rings or doors covering the openings O in the inner furnace walls. The raking apparatus includes a partially rotating or oscillating hollow column M, which passes loosely through the hub $W^2$, and carries rigidly attached hollow arms R projecting at right angles therefrom. The central pipe or column M is mounted in a seat or socket $h$ at its lower end and at its upper end is provided with a stuffing box $h'$ to prevent the blast which passes through the pipe from leaking. The outer end of each hollow arm R is screw-threaded and enters an annular screwthreaded flange R' projecting from a collar $R^2$. The inner end of the sleeve $R^3$ rests against the face of the collar $R^2$ and is provided with an annular flange $R^4$, the periphery of which rests against an annular flange $R^5$ projecting from the collar $R^2$. A plate or ring $R^6$ is secured to the annular flange $R^5$ and extends in front of the flange $R^4$ on the sleeve $R^3$, thus revolubly connecting the collar $R^2$ and sleeve $R^3$. A pipe $R^7$, which constitutes the shank of a rake E, extends through the openings O in the inner wall of the furnace, over each floor, and into the the sleeve $R^3$, and is secured thereto by means of a gib 1 held in place by means of keys 2. A pipe $R^8$ is screwed into the collar $R^2$ and extends into the pipe or shank $R^7$ preferably to the end of the sleeve $R^3$, said pipe $R^8$ having an annular flange $R^9$ at its forward end to bear against the inner face of the pipe or stem $R^7$. The outer end of said sleeve $R^3$ is supported by a bearing $R^{10}$ carried by an internally toothed wheel G, which latter is adapted to move on rollers 3 mounted in boxes 4, said boxes being supported by the spokes W or the plates $B^6$. Each toothed wheel G is driven by means of a pinion G' carried by a vertical shaft $G^3$, and said toothed wheels are preferably guided by idle pinions $G^2$. The upper end of the shaft $G^3$ is provided with a beveled gear $G^4$ adapted to receive motion from a bevel pinion $G^5$ on a horizontal shaft $G^6$. On the shaft $G^6$, three pulleys 5, 6, 7, are located, the central pulley 6 being keyed to the shaft and the pulleys 5 and 7 free to rotate thereon. Over these pulleys a straight and a crossed belt, from any convenient source of power, are adapted to pass, and will be shifted to alternately pass over the tight pulley 6 so that the shafts $G^3$ and $G^6$ will be driven alternately in reverse directions. From this construction and arrangement of parts it will be seen that the rakes will be driven from end to end of the hearths and made to return to their normal positions at the inner ends of the respective hearths.

Air will be forced through the pipes M and arms R,—escaping upon the ore, through suitable holes $b$ in the hollow rakes E. These rakes act alternately on successive floors.

They are balanced by being provided with a double set of spades or teeth $c$ which are made to rake at right angles and are so constructed as to make a quarter turn at the end of each stroke or part revolution, so that the rakes can be moved back to the starting end of each hearth without coming into contact with the ore and moving it in the wrong direction. The extent of the stroke of the rakes corresponds to the length of each furnace which, in turn, depends upon the number of supporting piers $P$, $P'$. In this case, two piers are shown, so that the rakes will make almost a semi-circular stroke. To prevent the falling ore from lodging upon the lower rake, the rakes are staggered or made to alternate on the adjacent floors, so that the idle ones are kept slightly in advance of the working rakes. The rakes can be changed or repaired through doors D, in the outside furnace wall.

Figures 3, 4:
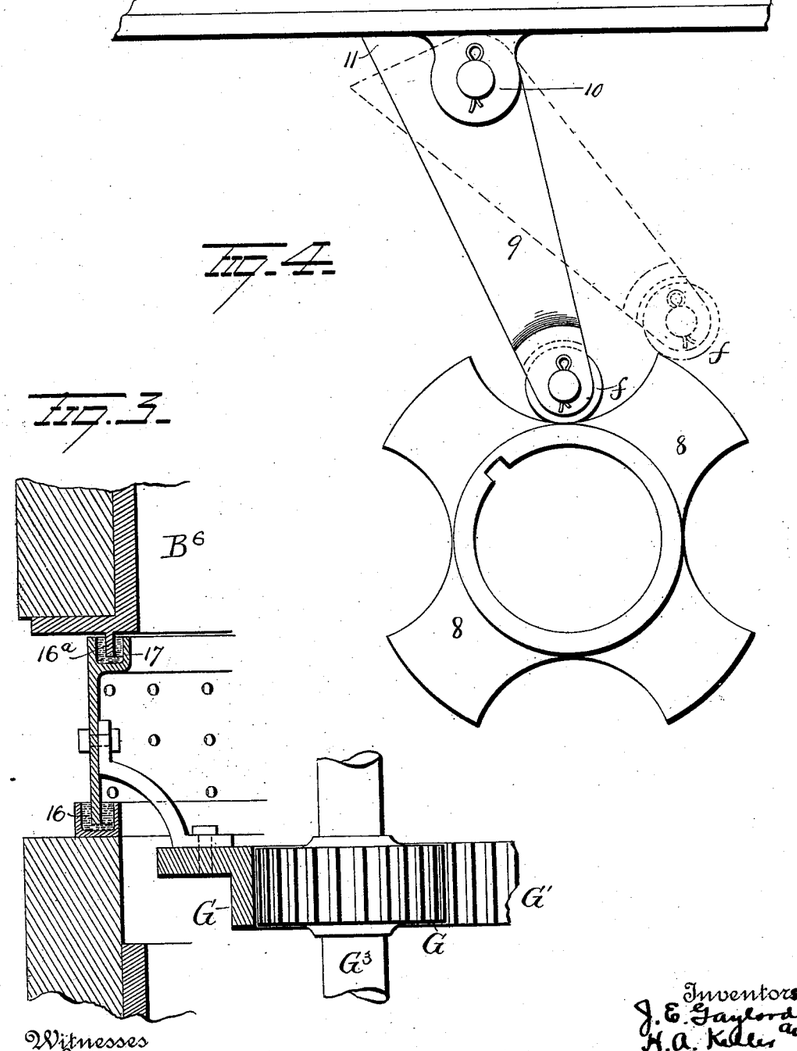
Fig. 3 is an enlarged detail view partly in section, showing sliding doors and means for operating them.
Fig. 4 is also an enlarged detail view showing the means employed for rocking the rakes.
Figure 3:
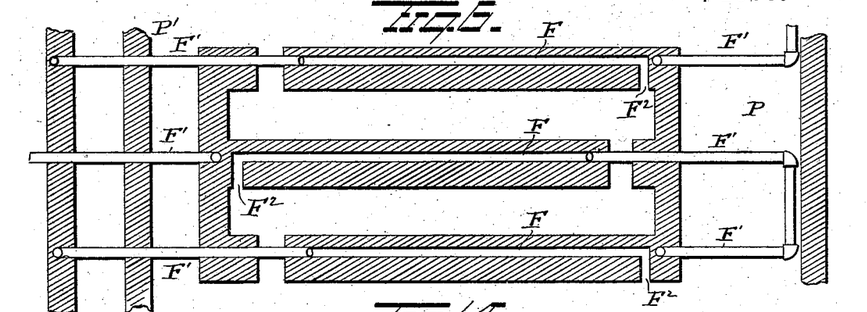
Figures 4, 5:
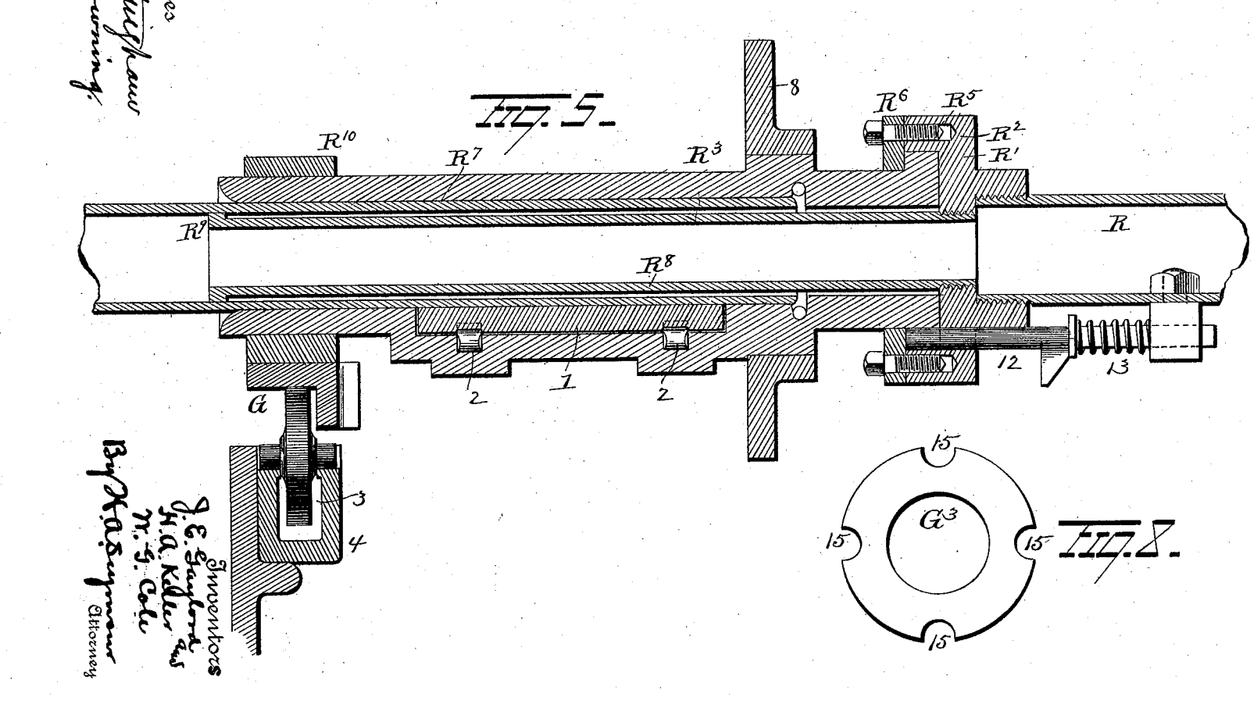
Fig. 5 is a vertical section through three of the hearths and piers P, P' showing the pipes F' discharging into the passages in the hearths and the discharge passages $F^2$.
Figure 4:
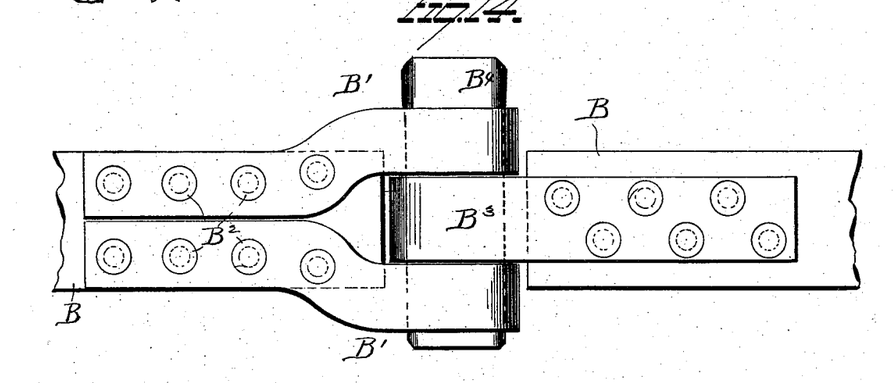
Figure 5:
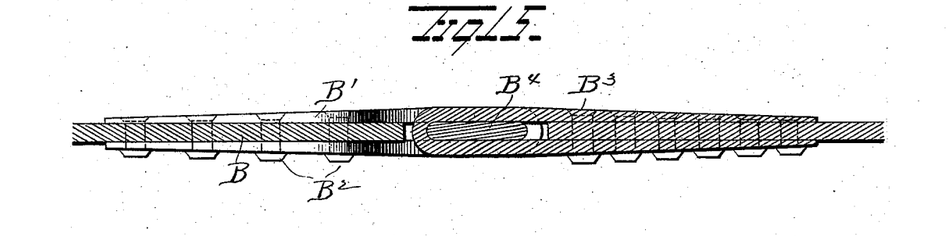
Figure 7:
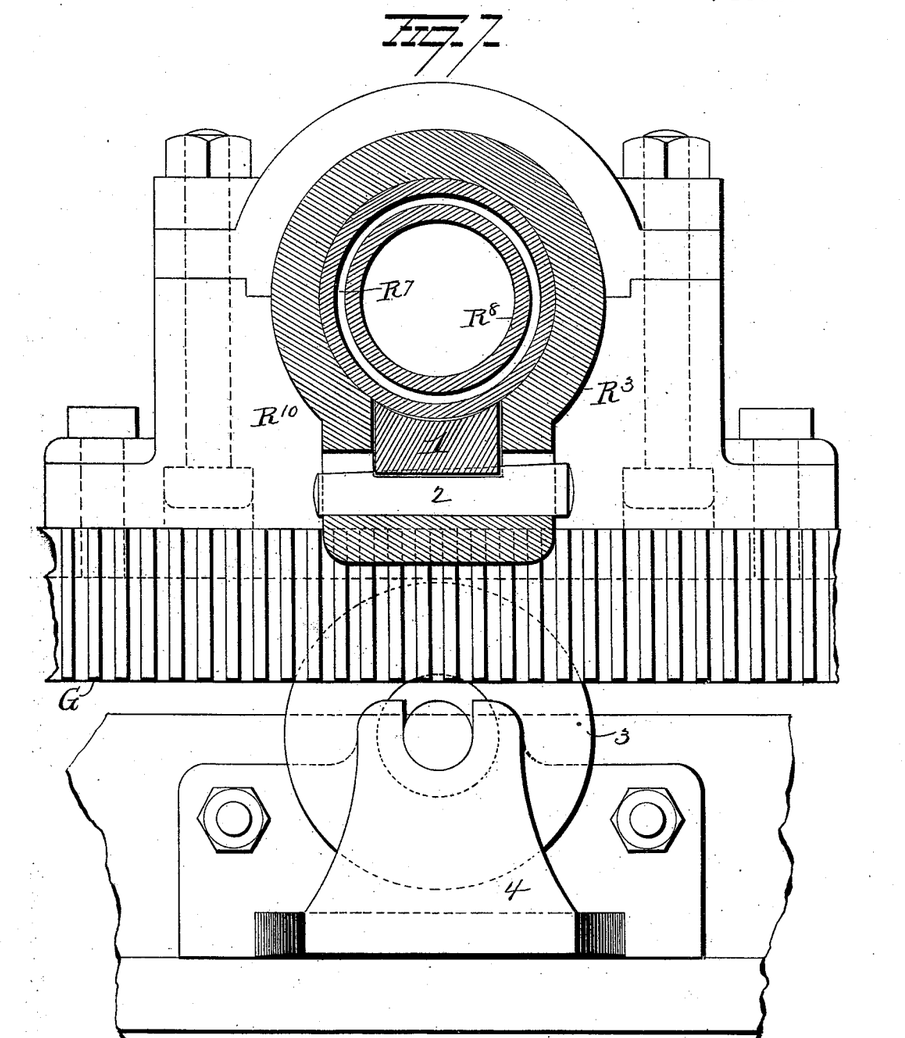
Fig. 7 is an enlarged transverse section through one of the rakes and showing the rack teeth G in elevation.
Figures 7, 9, 10, 11, 12, 13:
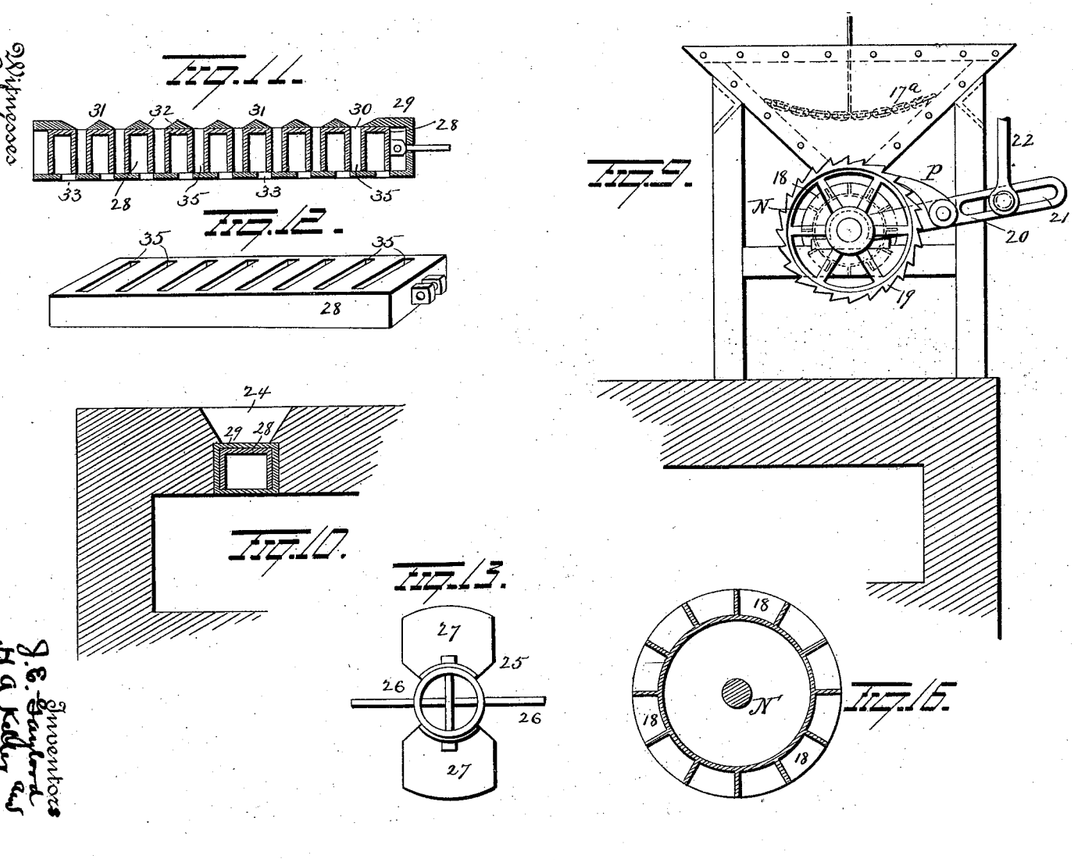
Fig. 9 is a view in side elevation of one of the hoppers and its connected mechanism.
Fig. 10 is a transverse sectional view through opening 24.
Figs. 11 and 12 are detached views of the box 28.
Fig. 13 is a view of the revolving propeller.

A star wheel 8 is secured to each sleeve $R^3$ and is adapted when the apparatus is in motion, to engage wheel $f$ carried by an arm 9, which latter is pivotally connected to lugs or ears 10 projecting from a spoke W, said arm having a shoulder 11 adapted to bear against said spoke. From this construction and arrangement of parts it will be seen that when one of the rakes reaches the end of its stroke one of the arms of the star wheel 8 will come into contact with the roller at the end of the adjacent arm 9, as shown by dotted lines in Fig. 4, said wheel being adapted to roll on the periphery of the star wheel and enter the recess between two projections or arms on said wheel, at which time the shoulder at the upper end of the arm 9 will engage the spoke which supports it. The backward movement of the rake will now cause one of the projections on the star wheel to bear positively against the roller of wheel $f$ at the end of the arm 8, and said arm will be prevented from swinging in that direction by the engagement of the shoulder 11 with the spoke W and the sleeve $R^3$, pipe $R^7$ and rake will be made to make a quarter revolution causing the teeth of the rake to move out of operative position relatively to the ore on the hearth at the forward end of the stroke or into operative position at the inner end of the stroke of said rake. To prevent the rake from making more than a quarter turn at any one time the annular flange $R^4$ at the end of the sleeve $R^3$ is provided with notches 15 for the reception of a dog 12 having a sliding movement in a perforation in the collar $R^2$ and a guide projecting from the arm R, said dog being retained normally in position to lock the sleeve $R^3$ by means of a spring 13. When the rake reaches the end of its stroke a projection on the dog 12 will engage an arm 14 projecting from the spoke W adjacent to the arm 9, thus withdrawing said dog and releasing the sleeve $R^3$. As soon as the arm 14 is passed the dog will be free to be forced, by the spring 13, into the next notch 15, of the flange $R^4$.

To exclude an excessive amount of cold air from entering the furnace through the above mentioned openings O, the latter are covered by rings or doors T, which travel forward and back, corresponding with the general motion of the mechanism,—said rings or doors being perforated for the passage of the shanks $R^7$ of the rakes. In order to render the union between the rings or doors T and the walls of the openings O, air tight, a trough 16 may be located in the openings O and adapted to contain sand or water into which the lower edges of the rings project, and the rings may also be provided with trough 17 for the reception of sand or water into which a flange $16^a$ projecting from the tops of the openings O project. The rings or doors T are directly moved and supported through the medium of rack bars or internally toothed wheels G and may also be perforated to admit of introducing cold air along the hearths, when desired.

Each furnace is fed mechanically at the top and the top arch may be used for preparatory drying of raw material. The ore is charged into the hopper N on top of the furnace and is prevented from clogging or packing by means of a shifting chain $17^a$. From this hopper the ore passes into pockets 18 in a revolving cylinder or drum, N'. To the cylinder or drum N' a ratchet wheel 19 is attached and adapted to be moved by a pawl $h$, the latter being carried by a vibratory arm 20 having an elongated slot 21, and to said arm 20 a link 22 is adjustably connected. Thus it will be seen that as the link 22 is operated the drum N' will be rotated, step by step, and the material made to escape from the pockets 18. The quantity of feed can be readily regulated by the position of the link 22 in the slot 21 of the arm 20 and also by the speed given to said link.

The revolving drum or cylinder N' is made to discharge the ore from one or more of the pockets 18 upon the top 23 of the furnace, at each stroke of the link 22. In this manner the waste heat at the top of the furnace will be utilized for the purpose of drying and heating the ore preparatory to feeding the same into the furnace. The ore, dumped upon the top of the furnace, is gradually propelled toward the feed opening 24 in the top of the furnace by a revolving rake or propeller 25, carried by the central column M. As this rake or propeller requires no air blast it is merely clamped to the central column M and it differs further from the other rakes by having two sets of pointed teeth 26 besides the flights or paddles 27. The paddles 27 serve to propel the ore along the top of the furnace in one direction and the teeth 26 merely stir and break up any crusts or cakes that might form, without propelling the ore. The propelled ore finally reaches a sliding box in the opening 24, composed, like a slide valve, of a box 28 and a casing 29. The casing 29 is made in its top with a series of openings 30, the webs 31 between said openings 30 having beveled faces 32 whereby to direct the material through said openings. The bottom of the casing 29 is made with a series of openings 33 out of line with the openings 30. The sliding box 28 in the casing 29 is made with a series of compartments 35. The ore passes through the openings 30 in the top of the casing and enters the compartments 35, by which it will be conveyed (when the box is slid) to the openings 33 in the bottom of the casing, through which it will escape onto the top hearth of the furnace. Thus it will be seen that the ore will be discharged into the furnace without at any time permitting a clear passage through the feed opening.

The auxiliary fire place S is attached so as to introduce on any floor, either directly the gases of combustion or only heated air or blast passing through the pipes F′ in connection with the flues F.

For further treatment, the roasted products can if desired, be fed directly to a reverberatory furnace, a fusing or sintering hearth either attached to our furnace or otherwise conveniently located, the waste heat of the former being utilized in the latter. Any high degree of heat thus required will in no way injure the mechanism of the roasting furnace as the latter can be so constructed that all artificial heat will pass through the pier P without coming into direct contact with any of the floors.

It may be desired with very wide furnaces to use water in the rakes for cooling purposes instead of air.

Since the firing may be done through a stack entirely free from sulphurous gases, our furnace is especially well adapted for the manufacture of sulphuric acid.

On account of the large heating surface and cheap handling, our furnace is also well adapted to serve as a cooling floor in connection with other chloridizing roasters, it having been found that a thin layer constantly agitated prevents chlorination from going back on the cooling floor.

While the mechanism above described for driving the rakes is quite simple and will accomplish the desired purpose, still we do not wish to confine ourselves to that particular mechanism, as this mechanism is susceptible of more or less change in construction without departing from the spirit of our invention.

Having fully described our invention, what we claim as new, and desire to secure by Letters Patent, is—

1. A roasting furnace having approximately semi-circular floors therein, and piers intervening between the ends of said floors whereby they are separated, substantially as set forth.

2. A roasting furnace having approximately semi-circular floors, arranged successively one above the other, and hollow piers located between the ends of the floors and extending the full height of the furnace, substantially as set forth.

3. A roasting furnace comprising concentric walls, arches sprung from the outer to the inner wall and having their thrust upon the outer wall and their crowns at the inner wall, and braces bearing against said arches at the crowns, substantially as set forth.

4. A roasting furnace comprising concentric walls, arches sprung from the outer to the inner wall and having their thrust upon the outer wall and their crowns at the inner wall, braces bearing against said arches at their crowns, and bands extending around the outside wall of the furnace in line with the thrust of the arches, substantially as set forth.

5. A roasting furnace having approximately semi-circular floors therein, hollow piers having communication with the hearths, said piers serving as flues and interposed between the ends of the floors, and air flues in communication with these piers, substantially as set forth.

6. A roasting furnace having approximately semi-circular floors, hollow piers between the ends of the floors, and pipes passing through these piers and in communication with the space between the floors, substantially as set forth.

7. A roasting furnace having roasting hearths therein and hollow piers in which the products of combustion are confined and from which they are discharged, means for supplying pure air to the hearths and means for conducting this air through the piers whereby it is heated without mingling with the products of combustion, substantially as set forth.

8. The combination with a roasting furnace having an opening in its inner wall, of a movable ring or door adapted to close said opening, said ring or door having a rack connected therewith and pinion for operating upon the rack to slide the ring or door, substantially as set forth.

9. The combination with a roasting furnace having an opening in its inner wall, of a movable ring or door adapted to close said opening, a rack connected with the ring or door, a pinion for moving the rack and door, and airtight joints between the edges of said ring or door and the furnace wall, substantially as set forth.

10. The combination with a roasting furnace having an opening in its inner wall, of a movable ring or door adapted to close said opening, said ring or door being provided with openings, a vertical pipe, hollow arms projecting from said vertical pipe, rakes located in said furnace and shanks projecting from said rakes through the openings in the ring or door and connected with the hollow arms, a rake connected with the ring or door, pinion for moving said ring, substantially as set forth.

11. The combination with a roasting furnace comprising two compartments, of a rake in each compartment, a vertical pipe, means for oscillating the latter, hollow arms projecting from said pipe and connected with the rakes, and means for automatically rocking said rakes at the ends of their strokes, substantially as set forth.

12. The combination with a roasting furnace comprising a tier of annular roasting floors, each floor being divided into a series of furnaces and the furnaces of one level communicating with those of the next lower, a rake in each furnace, means for supplying air to said rakes, means for reciprocating said rakes, and means for automatically rocking the rakes at the ends of the strokes thereof, substantially as set forth.

13. The combination with a roasting furnace having an opening in its inner wall, of a sliding ring or door adapted to close said opening, an internally toothed wheel or rack secured to said door, means for supporting said rack or internally toothed wheel, a shaft, a pinion carried by said shaft and adapted to mesh with said rack or wheel, rakes in said furnace having their shanks projecting through said annular door and means for supporting and carrying the rakes through the furnace, substantially as set forth.

14. A roasting furnace having hollow, reciprocating rakes balanced by a double set of teeth and means for reciprocating and rocking said rakes, substantially as set forth.

15. The combination with a roasting furnace of a reciprocating rake therein, means for reciprocating the latter, a vertical pipe, an arm projecting from said vertical pipe, a sleeve connected loosely with said arm, a shank projecting from the rake and secured to said arm, a star wheel carried by said sleeve, and an arm to be engaged by said star wheel whereby to cause the sleeve and rake to make a quarter revolution, substantially as set forth.

16. The combination with a roasting furnace, of a reciprocating rake therein, means for reciprocating the latter, a vertical pipe, an arm projecting from said vertical pipe, a sleeve connected loosely with said arm, a shank projecting from said rake and secured to said arm, a star wheel carried by said sleeve, an arm to be engaged by said star wheel, whereby to cause the sleeve and rake to make a quarter revolution, and means for locking said sleeve to prevent more than a quarter revolution thereof at a time, substantially as set forth.

17. The combination with a roasting furnace, of a reciprocating rake therein, means for reciprocating the latter, a vertical pipe, an arm projecting from said vertical pipe, a sleeve connected loosely with said arm, a shank projecting from said rake and secured to said arm, a star wheel carried by said sleeve, an arm to be engaged by said star wheel whereby to cause the sleeve and rake to make a quarter revolution, a spring actuated dog adapted to normally lock said sleeve and prevent it from making more than a quarter revolution at a time, and an arm adapted to automatically withdraw said dog when the rake reaches the end of a stroke, substantially as set forth.

18. The combination with a roasting furnace, of a reciprocating rake therein, means for reciprocating the latter, a vertical pipe, an arm projecting from said pipe, a sleeve connected loosely with said arm, a shank projecting from the rake and secured to said arm, a star wheel carried by said sleeve, a pivotally supported arm having a shoulder to limit its movement in one direction, said arm being adapted to be engaged by the star wheel, whereby to cause the sleeve and rake to make a quarter revolution, substantially as set forth.

19. The combination with a roasting furnace, of a reciprocating rake therein, means for reciprocating the latter, a vertical pipe, an arm projecting from said pipe, a sleeve connected loosely with said arm, a shank projecting from the rake and secured to said arm, a star wheel carried by said sleeve, a pivotally supported arm having a shoulder to limit its movement in one direction, and a roller or wheel in the end of said arm, said roller or wheel being adapted to be engaged by the star wheel, whereby to cause a quarter revolution of the sleeve and rake, substantially as set forth.

20. The combination with a roasting furnace, of a hopper, a shifting or agitating chain in said hopper and means for gradually feeding material through said hopper, substantially as set forth.

21. In a roasting furnace, the combination with a hearth, a hollow pier having an opening communicating with said hearth, and a rake, of a door adapted to normally close said opening and to be opened by engagement of the rake therewith, substantially as set forth.

In testimony whereof we have signed this specification in the presence of two subscribing witnesses.

HERMANN A. KELLER.
WILLIAM G. COLE.
JARED E. GAYLORD.

Witnesses:
WILBUR G. BENHAM,
ROBT. J. GRANT.